US009390142B2

(12) United States Patent  
Panda et al.

(10) Patent No.: US 9,390,142 B2  
(45) Date of Patent: Jul. 12, 2016

(54) GUIDED PREDICTIVE ANALYSIS WITH THE USE OF TEMPLATES

(71) Applicants: Sambit Panda, Bangalore (IN); Sujit Ramesh A, Bangalore (IN)

(72) Inventors: Sambit Panda, Bangalore (IN); Sujit Ramesh A, Bangalore (IN)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 14/297,333

(22) Filed: Jun. 5, 2014

(65) Prior Publication Data

US 2015/0356085 A1    Dec. 10, 2015

(51) Int. Cl.  
*G06F 17/30* (2006.01)  
*G06N 5/04* (2006.01)

(52) U.S. Cl.  
CPC ...... *G06F 17/3053* (2013.01); *G06F 17/30424* (2013.01); *G06F 17/30598* (2013.01); *G06N 5/04* (2013.01)

(58) Field of Classification Search  
CPC .......... G06F 17/3053; G06F 17/30598; G06F 17/30424; G06F 17/30; G06N 5/04  
See application file for complete search history.

(56) References Cited

U.S. PATENT DOCUMENTS

| 8,301,628 | B2* | 10/2012 | Clark | G06N 5/022 707/736 |
| 2005/0234753 | A1* | 10/2005 | Pinto | G06Q 10/04 700/44 |
| 2013/0311968 | A1* | 11/2013 | Sharma | G06Q 10/06 717/101 |
| 2015/0278214 | A1* | 10/2015 | Anand | G06F 17/30696 707/748 |

* cited by examiner

*Primary Examiner* — Bruce Moser  
(74) *Attorney, Agent, or Firm* — Fountainhead Law Group PC (57) ABSTRACT

A technique is described that simplifies the process for applying predictive analysis to a dataset. The technique can recommend multiple templates to a user. Each recommend template contains algorithms which can be applied to the dataset. When a template is selected, the technique can rank the available algorithms of the selected template based on factors such as values in the dataset, characteristics of the dataset, and the usage history of the dataset or the algorithms in prior instances. The technique can automatically select the highest ranked algorithm and apply it to the dataset. In some examples, input parameters used to configure the algorithm can also be automatically selected.

20 Claims, 9 Drawing Sheets

GUIDED PREDICTIVE ANALYSIS WITH THE USE OF TEMPLATES

BACKGROUND

Predictive analytics has become increasingly popular in the world of big data. Predictive analytics is the application of statistical algorithms on a dataset to identify patterns for predicting future events. These identified patterns can be exploited to identify potential risks and opportunities. For example, forecasting analysis can predict future performance based on collected data. As another example, probability analysis can predict the likelihood that a scenario will occur. Business organizations that can accurate predict future events will be more successful since they can adjust their business to best exploit the patterns found in the data.

Although predictive analytics is a valuable tool, many business organizations have difficult applying it. First of all, there are many different types of statistical algorithms and the applicability of each can be situational depending on the collected data. Secondly, the behavior of each statistical algorithm can vary depending on the input parameters applied to the statistical algorithm. As a result, a user requires a deep understanding of the different types of statistical algorithms available and the scenarios where each algorithm can be applied to accurately forecast future events. Given that most users in the business organization lack this deep understanding, they are unable to take advantage of predictive analytics.

SUMMARY

In one embodiment, a computer-implemented method identifies, by a computer system, a plurality of templates from a template library that are applicable to a dataset. The method then ranks, by the computer system, the plurality of templates into a ranked list. The method then detects, by the computer system, a selection of a template from the ranked list. The method then retrieves, by the computer system, a plurality of algorithms that are associated with the template. The method then ranks, by the computer system, the plurality of algorithms. The method then selects, by the computer system, an algorithm from the plurality of algorithms having the highest ranking. Finally, the method applies, by the computer system, the selected algorithm to the dataset to generate a result.

In one example, the selected algorithm is configured using an input parameter and applying the selected algorithm can include determining, by the computer system, that the dataset has been analyzed in a prior instance, identifying, by the computer system, a value assigned to the input parameter when analyzing the dataset during the prior instance, and configuring, by the computer system, the selected algorithm by setting the input parameter to the value.

In another example, the selected algorithm is configured using an input parameter applying the selected algorithm can include determining, by the computer system, that the selected algorithm has been used in a prior instance for analysis, identifying, by the computer system, a value assigned to the input parameter of the selected algorithm during the analysis, and configuring, by the computer system, the selected algorithm by setting the input parameter to the value.

In another example, identifying the plurality of templates can include parsing, by the computer system, the dataset to determine that the dataset includes data having a data type, determining, by the computer system, that the data type satisfies a cardinality rule of the template, the cardinality rule specifying data having the data type as input for the plurality of algorithms associated with the template, and identifying, by the computer system the template as one of the plurality of templates based on the determination.

In another example, the plurality of templates can be ranked according to at least one of a usage history and the dataset. For instance, ranking the plurality of algorithms can include first determining, by the computer system, that the dataset contains a missing value in a column of the dataset, second determining, by the computer system, that the algorithm is capable of handling missing values, and adjusting, by the computer system, a ranking for the algorithm based on the first and second determination. Alternatively, ranking the plurality of algorithms can include first determining, by the computer system, that the dataset contains a column of values that are increasing or decreasing, second determining, by the processor, that the algorithm is capable of handling increasing or decreasing values, and adjusting, by the computer system, a ranking for the algorithm based on the first and second determination.

In another embodiment, a non-transitory computer readable storage medium stores one or more programs comprising instructions for identifying a plurality of templates from a template library that are applicable to a dataset, ranking the plurality of templates into a ranked list, detecting a selection of a template from the ranked list, retrieving a plurality of algorithms that are associated with the template, ranking the plurality of algorithms, selecting an algorithm from the plurality of algorithms having the highest ranking, and applying the selected algorithm to the dataset to generate a result.

In another embodiment, a computer implemented system comprises one or more computer processors and a non-transitory computer-readable storage medium. The non-transitory computer-readable storage medium comprises instructions, that when executed, control the one or more computer processors to be configured for identifying a plurality of templates from a template library that are applicable to a dataset, ranking the plurality of templates into a ranked list, detecting a selection of a template from the ranked list, retrieving a plurality of algorithms that are associated with the template, ranking the plurality of algorithms, selecting an algorithm from the plurality of algorithms having the highest ranking, and applying the selected algorithm to the dataset to generate a result.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
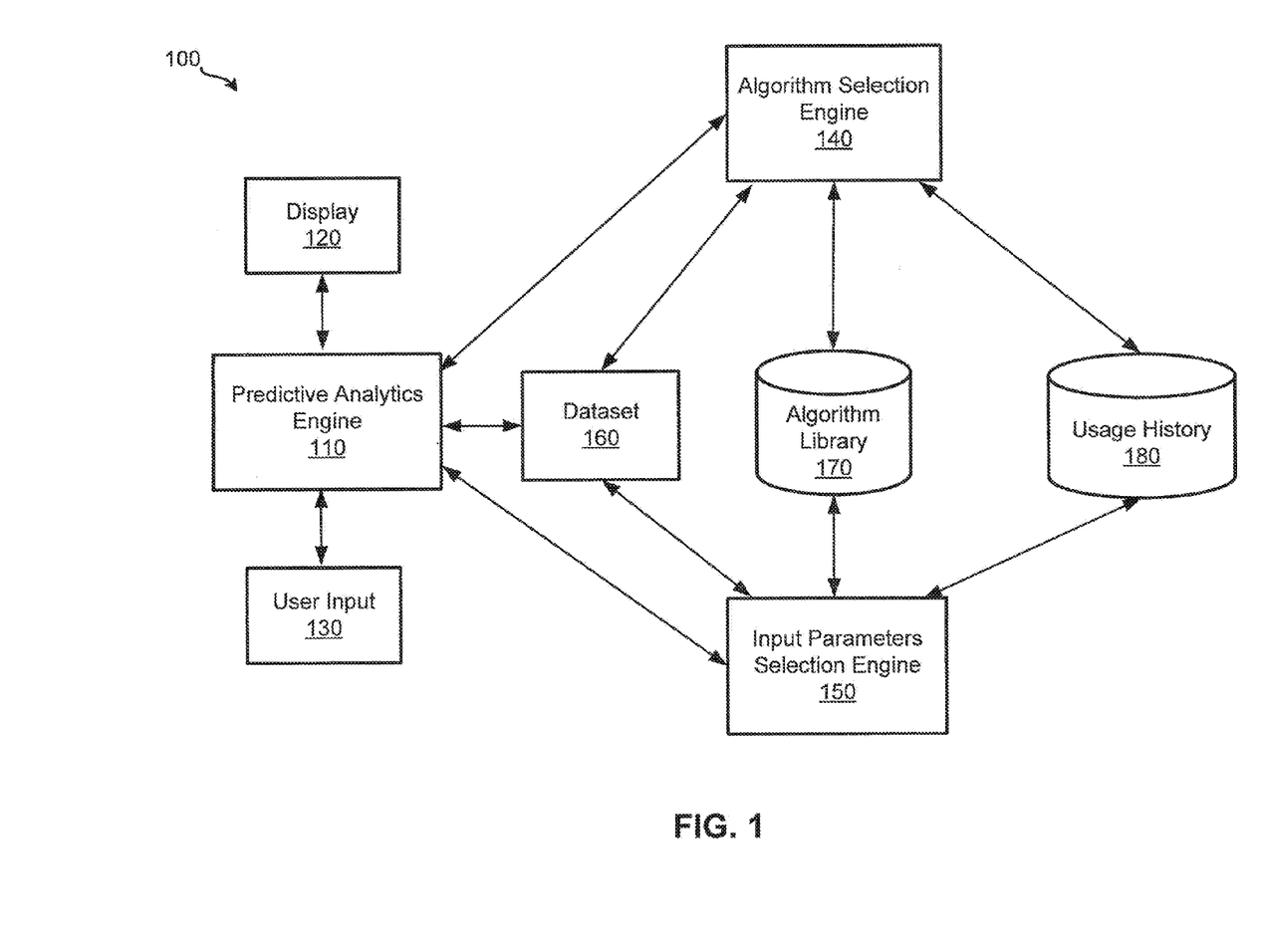
FIG. 1 illustrates a system according to one embodiment.

Various embodiments herein describe a system that simplifies the process for applying predictive analytics to a dataset. The techniques described herein can recommend one or more algorithms that are applicable to the dataset. The recommendations can be provided based on the usage history of the algorithms (including users requesting the analysis and the analysis preferred for a given user) and also an analysis of the dataset. By providing recommended algorithms to the user, the user can still perform predictive analytics without requiring a deep understanding on which algorithms can be applied to a given dataset. In some embodiments, the system can also recommend input parameters for a selected algorithm. In some examples, the algorithms can be statistical algorithms for performing predictive analytics. In other examples, the algorithms can be for performing other types of analysis FIG. 1 illustrates system 100 according to one embodiment. System 100 includes multiple components that together can assist a user in performing predictive analytics. System 100 includes predictive analytics engine 110, algorithm selection engine 140, and input parameters selection engine 150. Algorithm selection engine 140 can recommend algorithms for dataset 160 while input parameters selection engine 150 can recommend input parameters for a given algorithm. Together, these two engines can configure an algorithm. Predictive analytics engine 110 can execute the configured algorithm on dataset 160 to generate predicted values for dataset 160. Together, the predictive values can form a predictive model for predicting the outcome of future events. By using recommendations provided by algorithm selection engine 140 and input parameters selection engine 150, a user without extensive knowledge on how to utilize algorithms can still perform predictive analytics.

Predictive analytics engine 110 is configured to apply an algorithm to dataset 160 to generate a predictive model. Some algorithms can be configured using input parameters which control the behavior of the algorithm. For example, the number of clusters is an input parameter in a k-means clustering statistical algorithm. System 100 can evaluate user metadata and dataset 160 to provide a recommended algorithm and recommended input parameters for the recommended algorithm. In some examples, the recommended algorithm can be specified through user input 130, automatically determined by algorithm selection engine 140, or determined through a combination of user input 130 and algorithm selection engine 140. Similarly, the input parameters can be specified through user input 130, automatically determined by input parameters selection engine 150, or determined through combination of user input 130 and input parameters selection engine 150. Once predictive analytics engine 110 receives the desired algorithm and optionally the desired input parameters, the predictive model is generated as the result.

Algorithm selection engine 140 is configured to recommend one or more algorithms from algorithm library 170 that are applicable to dataset 160. In one embodiment, algorithm selection engine 140 can recommend one or more algorithms based on the data types stored in dataset 160. This can ensure that the recommended algorithms can be applied to dataset 160. For example, an algorithm for analyzing non-numerical data (e.g., name and title data) may not applicable to financial data (e.g., sales, revenue, etc.). Similarly, an algorithm for analyzing financial data (e.g., sales, revenue, etc.) may not be applicable to temporal data (e.g., date, time, etc.). In some examples where more than one algorithm is recommended, algorithm selection engine 140 can rank the algorithms based on which is a better match for the data types within dataset 160. The ranked list of algorithms can be presented to the user so that the user can select the algorithm to apply. Alternatively, the highest ranked algorithm can be automatically selected by default.

In another embodiment, algorithm selection engine 140 can recommend algorithms based on usage history of the algorithms in algorithm library 170. The usage history of the algorithms can be stored in usage history 180. In one example, usage history can include statistics tracking the algorithms that are commonly used by a particular user. For instance, algorithm selection engine 140 can recommend an algorithm that the user frequently applies in predictive analysis engine 110. In another example, usage history can include statistics tracking the algorithms commonly used by a group of users in the organization. The group of users can be users having the same role in the organization, users having the same title in the organization, or users in the same group within the organization. For instance, algorithm selection engine 140 can recommend an algorithm that the user's group frequently uses. In yet another example, usage history can include statistics tracking the algorithm that is commonly applied to dataset 160. If dataset 160 has been analyzed multiple times in the organization by different users in the organization, statistics can be generated that track which algorithms have frequently been used to analyze dataset 160. It is likely that the user would like to use one of the algorithms that have been popular for dataset 160. For instance, algorithm selection engine 140 can recommend an algorithm from algorithm library 170 that has been frequently applied to dataset 160.

Once an algorithm has been selected (either by the user from a list of recommendations or automatically selected by algorithm selection engine 140), input parameters selection engine 150 can recommend input parameters for the selected algorithm. Input parameters selection engine 150 can select input parameters based on one or more factors including the algorithm, dataset 160, and usage history 180. For example if dataset 160 had previously been analyzed by the user or another user in the organization, input parameters selection engine 150 can recommend the same input parameters that were previously used with dataset 160. As another example if the selected algorithm has previously been used by the user or another user in the organization, input parameters selection engine 150 can recommend the same input parameters that were previously used with the algorithm for this iteration of the algorithm. As yet another example, input parameters for the algorithm can be selected from a list of input parameters that are frequently used by the user.

Once the algorithm and input parameters have been selected, predictive analytics engine 110 can analyze dataset 160 according to the selected algorithm and input parameters.

The results of the analysis can be presented on display 120. In some examples, the presentation of the results can be modified according to input detected by user input 130. The results can also be used to generate a predictive model.

Figure 2:
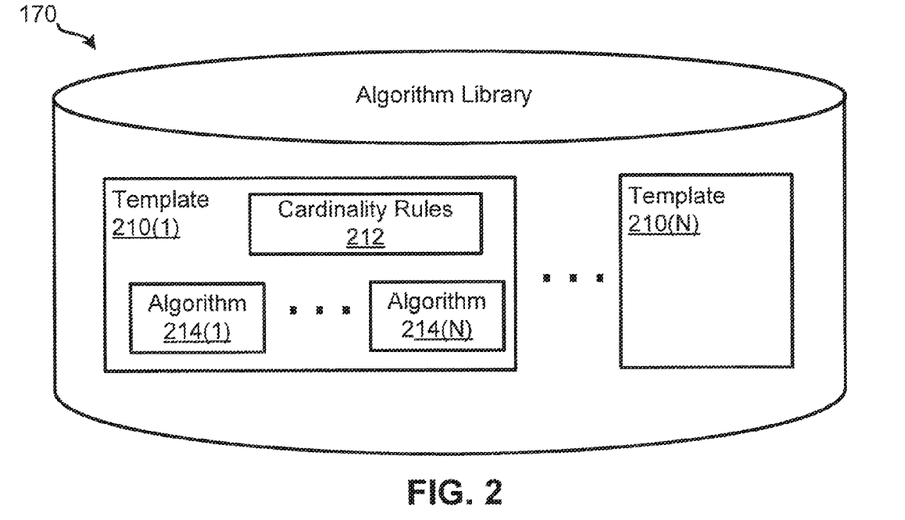
FIG. 2 illustrates an algorithm library according to one embodiment.

FIG. 2 illustrates an algorithm library according to one embodiment. Algorithm library 170 includes template 210(1) to 210(N). Each template contains a collection of algorithms that share some commonality. In one example, a template contains a collection of algorithms that belong to the same or similar category. For instance, a template for classification analysis can include multiple classification algorithms like K nearest neighborhood, naïve bias, C 4.5 etc. All of these algorithms belong to the category known as classification algorithms. In another example, a template contains a collection of algorithms that share the same cardinality rules. For instance, a template can include multiple algorithms that are used to analyze columns of numerical data while another template can include multiple algorithms that are used to analyze columns of date/time data. The template containing algorithms to analyze numerical data can contain cardinality rules that define one or more conditions that are checked before an algorithm belonging to the template can be applied. Each cardinality rule can specify a condition for the template. For example, a cardinality rule for a template containing algorithms for analyzing date/time data can check whether dataset 160 includes a predefined number of columns that store date/time data or a particular configuration of columns. If dataset 160 includes the predefined number of columns or configuration of columns, the condition is satisfied. Algorithm selection engine 140 can check whether the cardinality rules that correspond to a template are satisfied when determining whether a template should be recommended to the user. Here, template 210(1) includes algorithms 214(1) to 214(N) and cardinality rules 212.

Figure 3:
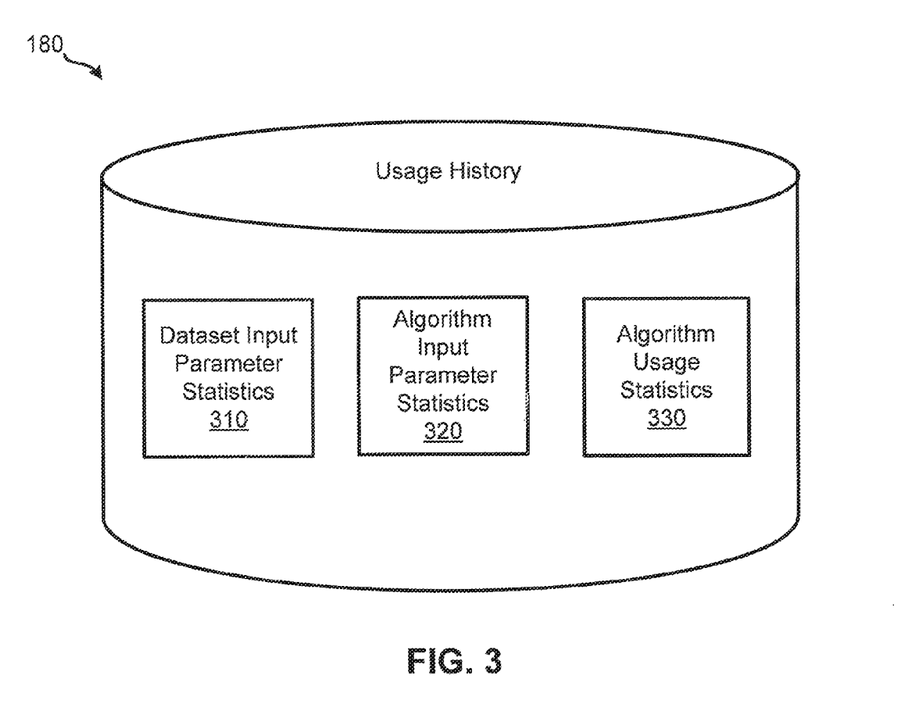
FIG. 3 illustrates a usage library according to one embodiment.

FIG. 3 illustrates a usage library according to one embodiment. Usage library 180 can store statistics on predictive analytics that have been performed within the organization. The statistics can be used by algorithm selection engine 140 or input parameters selection engine 150 when providing recommendations on algorithms and input parameters for a given dataset or user. Usage library 180 includes dataset input parameter statistics 310. Dataset input parameter statistics 310 can store information on input parameters that have been used with a given dataset. For example, dataset input parameter statistics 310 can link a dataset to input parameters that have been previously used with the dataset. The input parameters can be ranked according to popularity. In one embodiment, multiple ranked lists of input parameters can be linked to the dataset for each algorithm. Thus, there is a mapping from a list of input parameters to a dataset/algorithm combination. In other embodiments, a single list of input parameters can be linked to the dataset, regardless of the algorithm used with the dataset. Input parameters selection engine 150 can take into consideration input parameters that have previously been used with the dataset by querying dataset input parameters statistics 310. In response to the query, input parameters selection engine 150 can receive a set of input parameters or a ranked list containing multiple sets of input parameters. In one example, each unique dataset can have a unique identifier that is referenced in dataset input parameter statistics 310. Each unique set of input parameters can also have a unique identifier that is referenced in dataset input parameter statistics 310. Thus dataset input parameter statistics 310 is configured to map an identifier for a dataset to an identifier for a set of input parameters.

Usage library 180 further includes algorithm input parameter statistics 320. Algorithm input parameter statistics 320 is configured store information on input parameters that have been used for a given algorithm. Thus, algorithm input parameter statistics 320 can map an algorithm to one or more sets of input parameters that have been previously applied with the algorithm. Similar to dataset input parameter statistics 310, a single set of input parameters or multiple sets of input parameters can be returned in response to an algorithm. Also similar to dataset input parameter statistics 310, unique identifiers can be used to by algorithm input parameter statistics 320 to simplify the database. Other databases (not shown) can store the content referenced by the unique identifiers.

Usage library 180 further includes algorithm usage statistics 330. Algorithm usage statistics 330 is configured to store information on algorithms that are popular within the organization. The information can include statistics of algorithms that are popular for a particular user, a particular group of users, or the organization as a whole. In one embodiment, algorithm selection engine 140 can query usage library 180 using user metadata (such as a unique identifier of the user, the group that the user belongs to, the user's role in the organization, etc.) to identify one or more algorithms (or templates) that are recommended to the user.

In some embodiments, algorithm selection engine 140 can examine the cardinality rules of the templates and also usage library 180 to identify one or more recommended templates for the user. Similarly, input parameters selection engine 150 can examine dataset input parameter statistics 310 and algorithm input parameter statistics 320 to select a set of input parameters for an algorithm.

Figure 4:
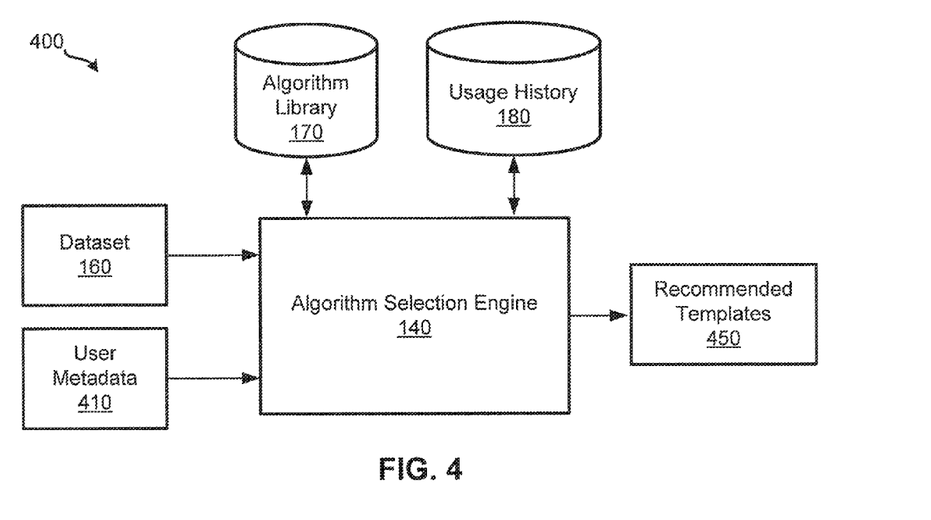
FIG. 4 illustrates a system for recommending templates according to one embodiment.

FIG. 4 illustrates a system for recommending templates according to one embodiment. System 400 includes algorithm selection engine 140. Algorithm selection engine 140 receives dataset 160 and user metadata 410. User metadata 410 can include information that identifies or describes the user. For example, user metadata 410 can include a unique identifier of the user, a group identifier of a group that the user belongs to, or a role identifier of a role which the user has been designated as by the organization. Algorithm selection engine 140 can analyze these inputs by using algorithm library 170 and usage history 180 to generate recommended templates 450. One exemplary process flow for generating recommended templates 450 is described below in FIG. 9. Another exemplary process flow for recommending an algorithm within a template is described below in FIG. 10. In other embodiments, system 400 can also be configured to recommend algorithms rather than templates.

Figure 5:
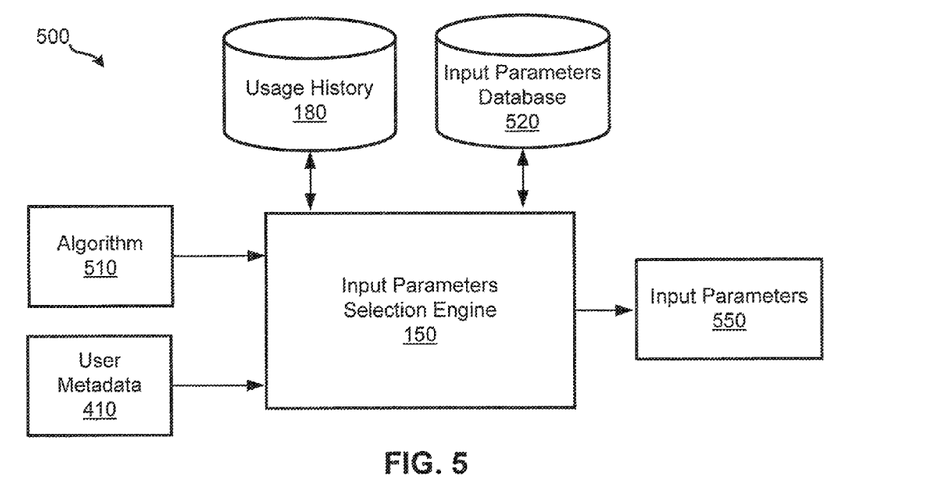
FIG. 5 illustrates a system for recommending input parameters according to one embodiment.

FIG. 5 illustrates a system for recommending input parameters according to one embodiment. System 500 includes input parameters selection engine 150. Input parameters selection engine 150 receives statistical algorithm 150 along with user metadata 410 and generates input parameters 550 which are to be applied to algorithm 510. Input parameters selection engine 150 can analyze the received inputs by using usage history 180 and input parameters database 520 to generate input parameters 550. One exemplary process flow for recommending input parameters is described below in FIG. 11.

Figure 6:
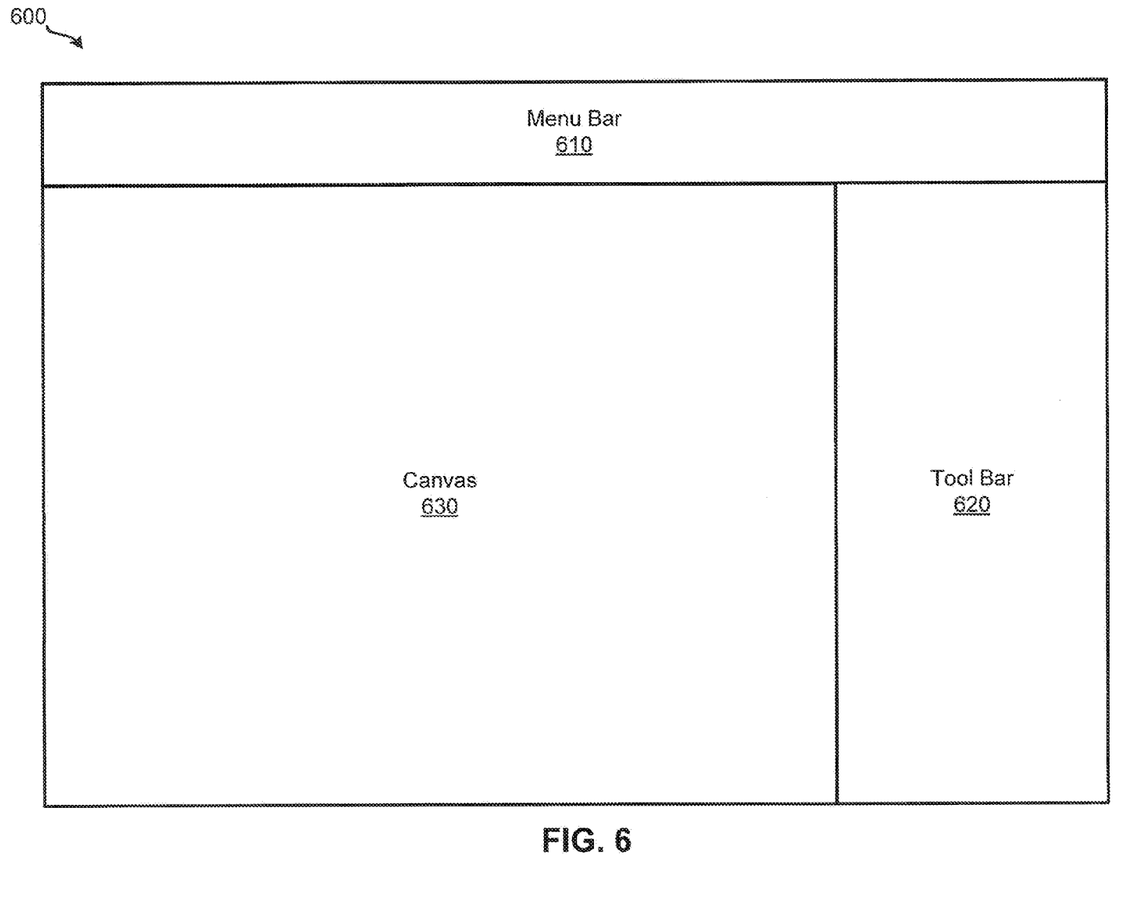
FIG. 6 illustrates a graphical user interface (GUI) for performing predictive analytics according to one embodiment.

FIG. 6 illustrates a graphical user interface (GUI) for performing predictive analytics according to one embodiment. GUI 600 is part of an application which is configured to perform analytics on a dataset. As shown, GUI 600 includes menu bar 610, tool bar 620, and canvas 630. Menu bar 610 is configured present one or more features that are available in the application. One of the features can be a predictive analytics feature. Toolbar 620 is configured to present tools that are available for a particular feature. Selecting a feature in menu bar 610 can dynamically change the tools presented in toolbar 620. For example, selecting the predictive analytics feature in the menu bar can dynamically update toolbar 620 to display one or more tools that are available for predictive analytics. One of the tools can be a template recommendation tool that can recommend templates to the user according to user metadata and a loaded dataset. Results of the predictive analytics can be presented on canvas 630.

Figure 7:
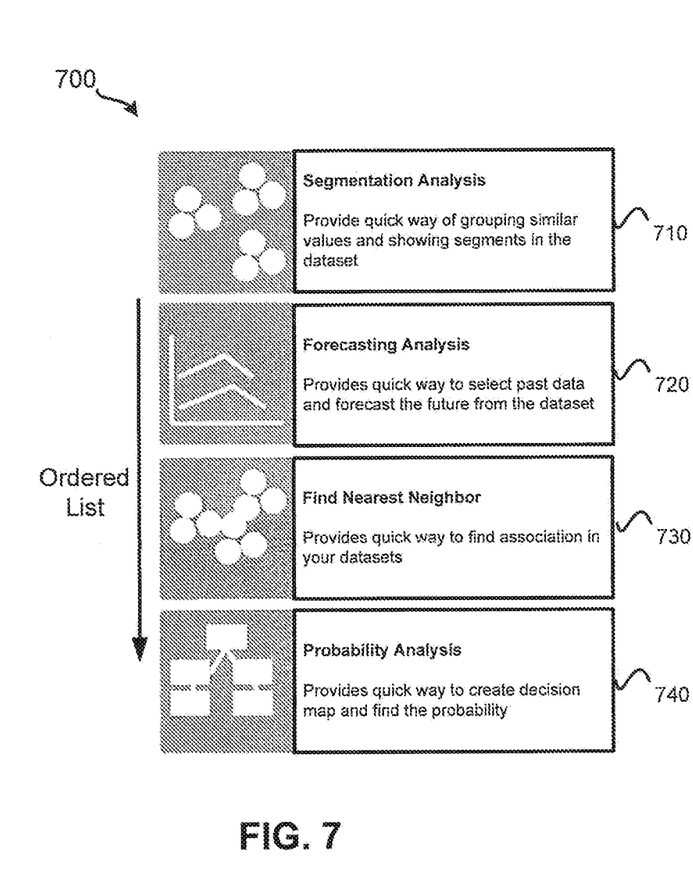
FIG. 7 illustrates an ordered list of templates according to one embodiment.

FIG. 7 illustrates an ordered list of templates according to one embodiment. List 700 can be presented as part of toolbar 620 when a request is received to recommend a template that is applicable to the loaded dataset. As shown, list 700 is an ordered list that includes templates 710, 720, 730, and 740. Each template can represent group of algorithms that belong to the same category. Here, template 710 stores segmentation analysis algorithms, template 720 stores forecasting analysis algorithms, template 730 stores find nearest neighbor algorithms, and template 740 stores probability analysis algorithms. In some embodiments, the templates in list 700 can be ordered according to the template that is most applicable to the loaded dataset or the template that is most applicable to this particular user. In one example, list 700 can be generated based on the results of the algorithm selection engine 140. In response to a user selection of a template within list 700, algorithm selection engine 140 can present another ordered list of algorithms that belong to the template. The list of algorithms can be ordered based on various factors. For example, the list of algorithms can be ordered according to the algorithm that is most likely to be applicable to the loaded dataset. In another example, the list of algorithms can be ordered according to the algorithm that is most frequently selected by the user. In yet other examples, algorithm selection engine 140 can rank the algorithms within the selected template and automatically assign the highest ranked algorithm. The algorithms can be ranked according to the loaded dataset or the user.

Figure 8:
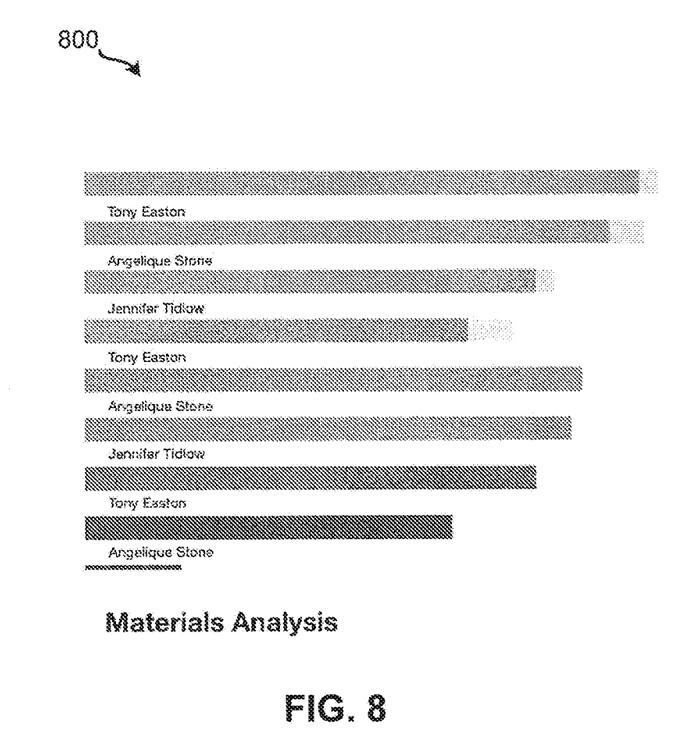
FIG. 8 illustrates a results view according to one embodiment.

FIG. 8 illustrates a results view according to one embodiment. Results view 800 can be based on the predictive model generated from the predictive analytics and can be presented in a window or tile of canvas 630. In one embodiment, algorithm selection engine 140 can automatically select an algorithm when a template from list 700 is selected. Once the algorithm is selected, predictive analytics engine 110 can apply the selected algorithm to the loaded dataset to generate a predictive model. Once the predictive model is generated, various visualizations can be generated from the predictive model to be presented to the user on canvas 630.

Figure 9:
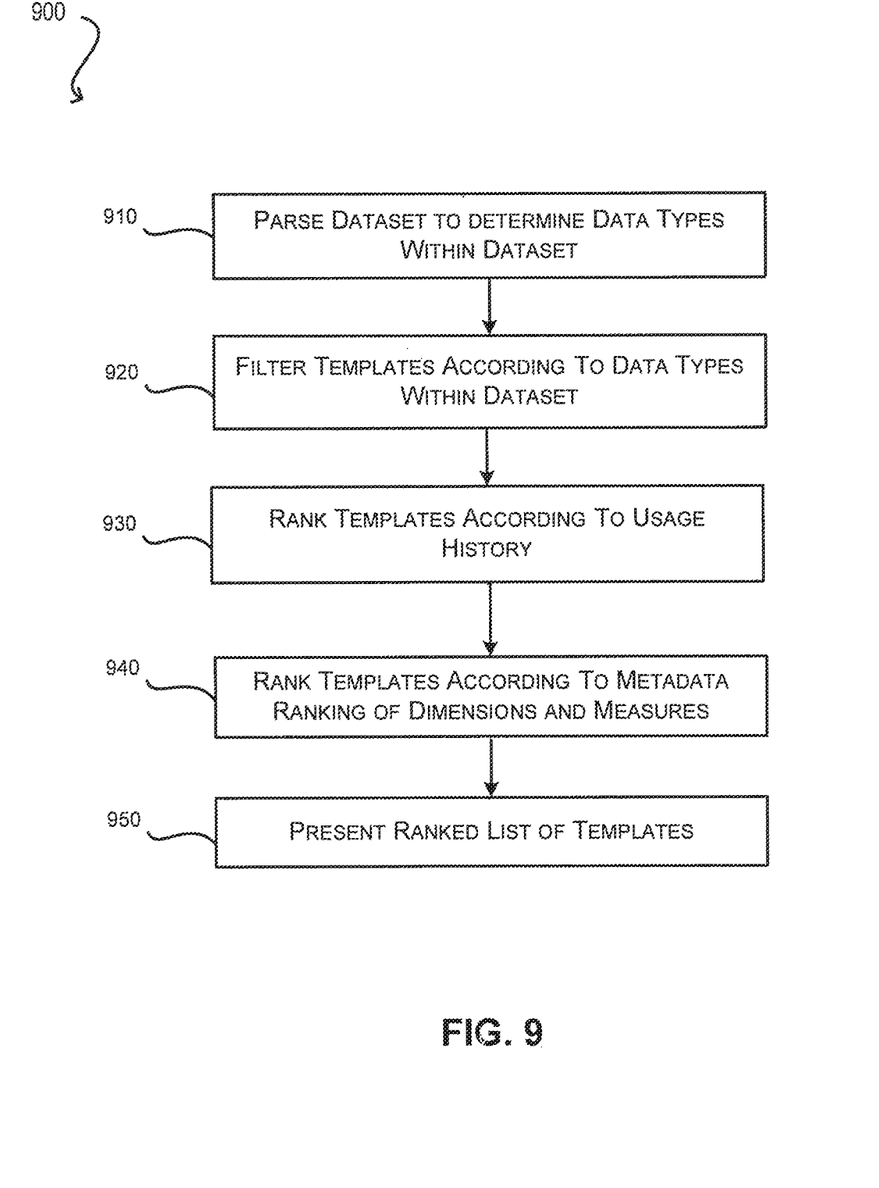
FIG. 9 illustrates a process flow for generating a ranked list of templates according to one embodiment.

FIG. 9 illustrates a process flow for generating a ranked list of templates according to one embodiment. Process 900 can be stored in computer readable medium and executed by a processor. In one embodiment, algorithm selection engine 140 of FIG. 1 can perform process 900. Process 900 begins by parsing a dataset to determine the data types within the dataset at 910. Parsing the dataset can include analyzing each column of the dataset to identify the types of data that are stored in each column. In one example, this can be performed by examining metadata of each column. Once the data types within the dataset have been determined, process 900 continues by filtering templates according to the data types within the dataset at 920. Filtering templates can include removing templates that are not applicable to the data types within the dataset. For example if the dataset does not include numerical data, then templates containing algorithms which analyze numerical data can be filtered out.

Once the templates have been filtered such that the templates which remain are templates which can be applied to the dataset, process 900 continue by ranking the templates according to usage history at 930. In some examples, the usage history can be stored in usage history 180 of FIG. 1. As described in FIG. 3, usage history 180 can include dataset input parameter statistics 310, algorithm input parameter statistics 320, and algorithm usage statistics 330. In one embodiment, process 900 can rank the templates according to templates which are popular to a particular user or amongst a particular group of users. Templates which are frequently used can be ranked higher than templates which are infrequently used.

Process 900 can continue by ranking the templates according to the metadata ranking of the data types within the dataset. In one embodiment, templates which are applicable to a larger number of data types within the dataset can receive a higher ranking. The combination of the metadata ranking and the usage history ranking (described in step 930) can result in the ranked list of templates. At 950, the ranked list of templates can be presented to the user. In other embodiments, process 900 can automatically select the highest ranked template rather than presenting the ranked list for manual selection.

Figure 10:
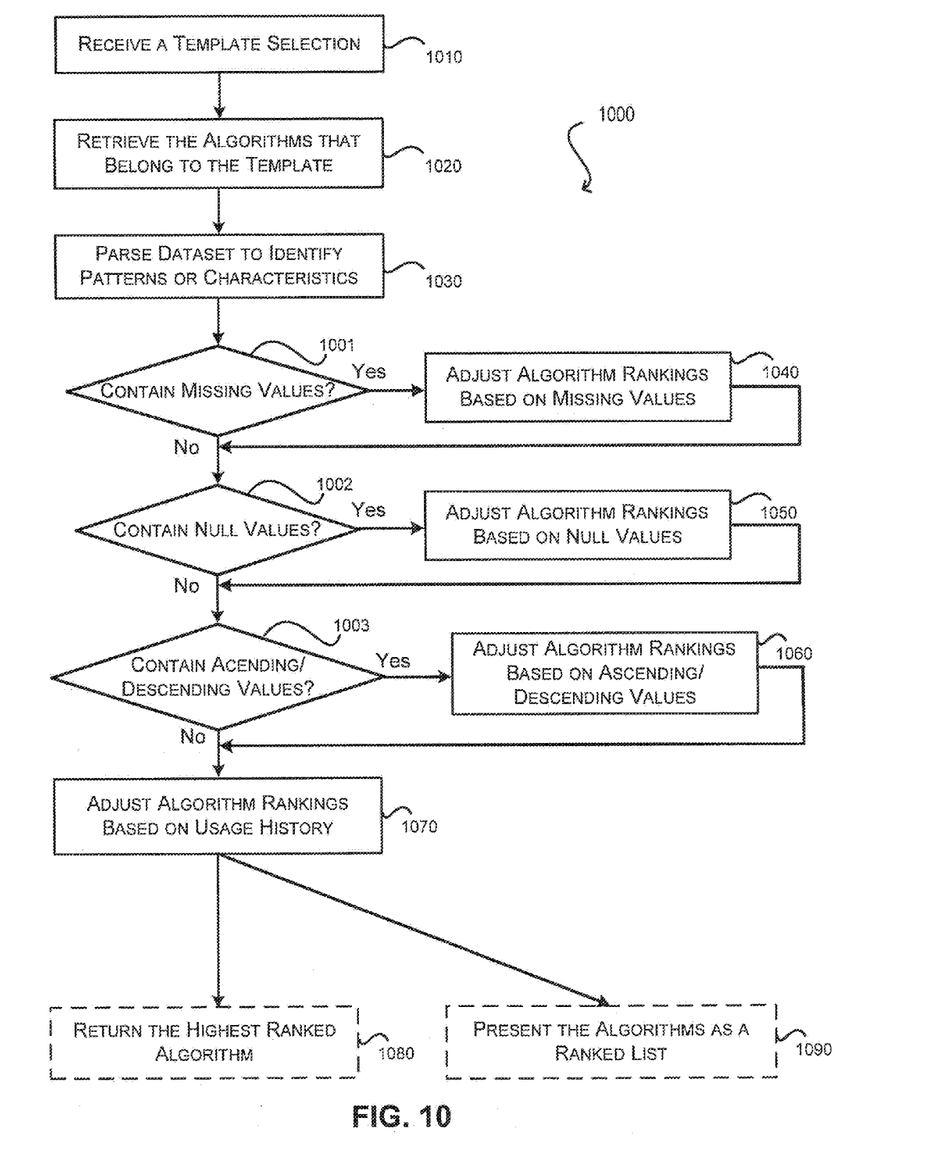
FIG. 10 illustrates a process flow for automatically selecting an algorithm in a template according to one embodiment.

FIG. 10 illustrates a process flow for automatically selecting an algorithm in a template according to one embodiment. Process 1000 can be stored in computer readable medium and executed by a processor. In one embodiment, the algorithm selection engine 140 of FIG. 1 can perform process 1000. Process 1000 begins by receiving a template selection at 1010. The template can be manually or automatically selected from a ranked list of templates. Upon receiving a template selection, process 1000 can retrieve the algorithms that belong to the template at 1020. The algorithms can be retrieved from a library such as algorithm library 170 in FIG. 1. Algorithm library 170 can be stored locally or remotely. At 1030, process 1000 continues by parsing the dataset to identify patterns in the dataset or characteristics of the dataset. Columns of the dataset can be parsed and analyzed to identify a pattern. An exemplary pattern in the dataset is a column having ascending or descending values. Another exemplary pattern can be that values in a column are changing at an exponential rate. Columns of the dataset can also be parsed and analyzed to identify a characteristic. Characteristics include that the dataset contains a missing value in a field or that the dataset contains a null value in a field.

Process 1000 then continues by determining whether the dataset contains missing values at 1001. This determination can be made by examining the patterns and characteristics identified in the dataset. If the dataset does contain missing values, process 1000 ranks the retrieved algorithms based on their ability to handle the missing values at 1040. For example, a first algorithm that receives as an input a column of the dataset that does not contain missing values can be ranked higher than a second algorithm that receives as an input another column of the dataset that does contain missing values. Similarly, an algorithm that is capable of handling the missing value can be ranked higher than another algorithm that is unable of handling the missing value.

Once the possibility of missing values in the dataset have been examined, process 1000 continues by determining whether the dataset contains null values at 1002. If the dataset does contain null values, process 1000 can adjust the rankings of the retrieved algorithms based on their ability to handle null values at 1050. Algorithms that do not depend on the null values or algorithms that are capable of handling the null values can be ranked higher. Similarly, algorithms that do depend on the null values or algorithms that are incapable of handling null values can be ranked lower.

Once the possibility of null values in the dataset have been examined, process 1000 continues by determining whether the dataset contains ascending/descending values at 1003. If the dataset does contain ascending/descending values, process 1000 can adjust the rankings of the retrieved algorithms based on their ability to handle ascending/descending values at 1060. For example, some algorithms may be configured to process a column having an ascending value while other algorithms may not.

In other embodiments, process 1000 can rank the algorithms using other factors that correspond to the dataset. For example, algorithms can be ranked based on their ability to handle the number of records in the dataset. Some algorithms may be better suited for smaller datasets while others are better suited for larger datasets. As a result, the number of records in the dataset can affect the rankings of the retrieved algorithms. If the dataset contains a large number of records, process 1000 can rank the retrieved algorithm based on their ability to handle the large number of records.

Once the algorithm rankings have been adjusted based on patterns and characteristics of the dataset, process 1000 can continue by adjusting the algorithm rankings based on usage history at 1070. Usage history can include the usage history by the particular user or the usage history of a group of users in the organization. Algorithms that are commonly used by the particular user or group of users can be ranked higher than unpopular algorithms. Once the algorithm rankings have been adjusted based on usage history, process 1000 can optionally return the highest ranked algorithm at 1080. In other words, process 1000 automatically recommends an algorithm for the particular user based on the selected template. The automatically selected algorithm can be applied to the dataset. Alternatively, process 1000 can optionally present the algorithms as a ranked list at 1090. The ranked list can be presented to the user where the user can select an algorithm to apply to the dataset. The ranking can assist the user in selecting an algorithm.

In other embodiments, process 1000 can prioritize the processing of the patterns and characteristics so that they are dependent upon one another. For example if the first pattern is found, the algorithms are ranked based on the first pattern only. If the second pattern is found but the first pattern is not, then the algorithms can be ranked based on the second pattern only. This allows the algorithms to be ranked based on a first pattern but not a second pattern even though the first pattern and the second pattern are both found in the dataset. To illustrate this example in FIG. 10, steps 1040, 1050, and 1060 would all return step 1070. Therefore, adjusting the algorithms rankings based on ascending/descending values would only be applied if the dataset does not contain missing values and null values but does contain ascending/descending values.

Figure 11:
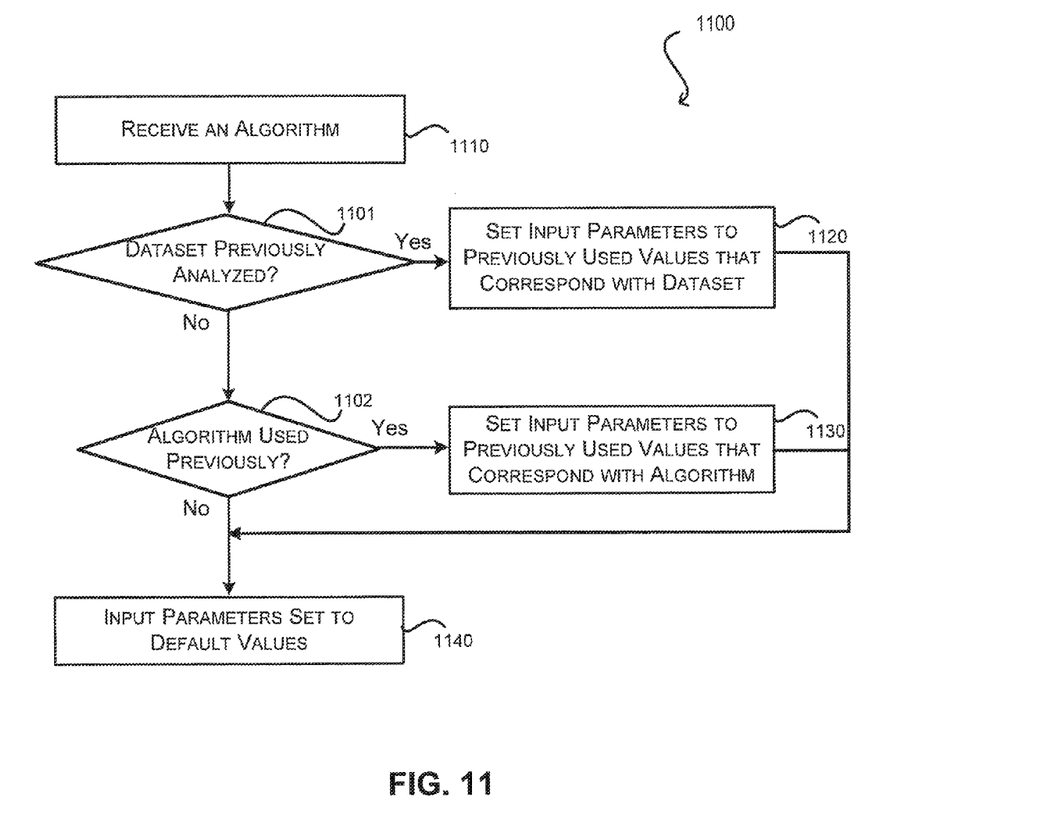
FIG. 11 illustrates a process flow for selecting input parameters for an algorithm according to one embodiment.

FIG. 11 illustrates a process flow for selecting input parameters for an algorithm according to one embodiment. Once an algorithm is selected, input parameters can be automatically selected. The input parameters can be used to configure the algorithm before the algorithm processes the dataset. Process 1100 can be stored in computer readable medium and executed by a processor. In one embodiment, input parameters selection engine 150 of FIG. 1 can perform process 1100. Process 1100 begins by receiving an algorithm at 1110. Input parameters can be automatically selected for the algorithm based on the dataset, the selected algorithm, the user history, or a combination of the above. Process 1100 can determine if the dataset was analyzed in a prior instance at 1101. If the dataset was analyzed in a prior instance, the input parameters that accompanied the algorithm used to analyze the dataset can be stored in usage history 180 as part of dataset input parameter statistics 310. In one embodiment, all the input parameters that are associated with analysis of the dataset using various algorithms can be tracked. Statistics can be generated for each algorithm/dataset combination or alternatively statistics can be generated by combining all input parameters that were applied while analyzing a dataset. If the dataset was previously analyzed, then process 1100 continues by setting the input parameters for the algorithm to previously used values that correspond with the dataset at 1120. In one example, input parameters for the selected algorithm can be selected from a set of parameters that are associated with the dataset. Since the dataset may have been analyzed using different algorithms and each algorithm can require different input parameters, the set of parameters can include input parameters used across multiple algorithms.

If the dataset has not been previously analyzed, process 1100 can continue by determining whether the selected algorithm has been previously used at 1102. It is possible to examine a previous instance where the selected algorithm was used to analyze data to determine the input parameters. It may be desirable to set the input parameters for the current instance of analysis using the selected algorithm to input parameters that were used during a previous instance of analysis using the selected algorithm. If the selected algorithm has been used in analysis during a prior instance, then process 1100 can set the input parameters to previously used values that correspond with the algorithm at 1130. If alternatively the dataset was not previously analyzed and the algorithm was not previously used, then process 110 can set the input parameters to default values. In some embodiments, the automatically selected input parameters can be presented to the user so that the user can modify the input parameters if desired before performing the analysis on the dataset.

Figure 12:
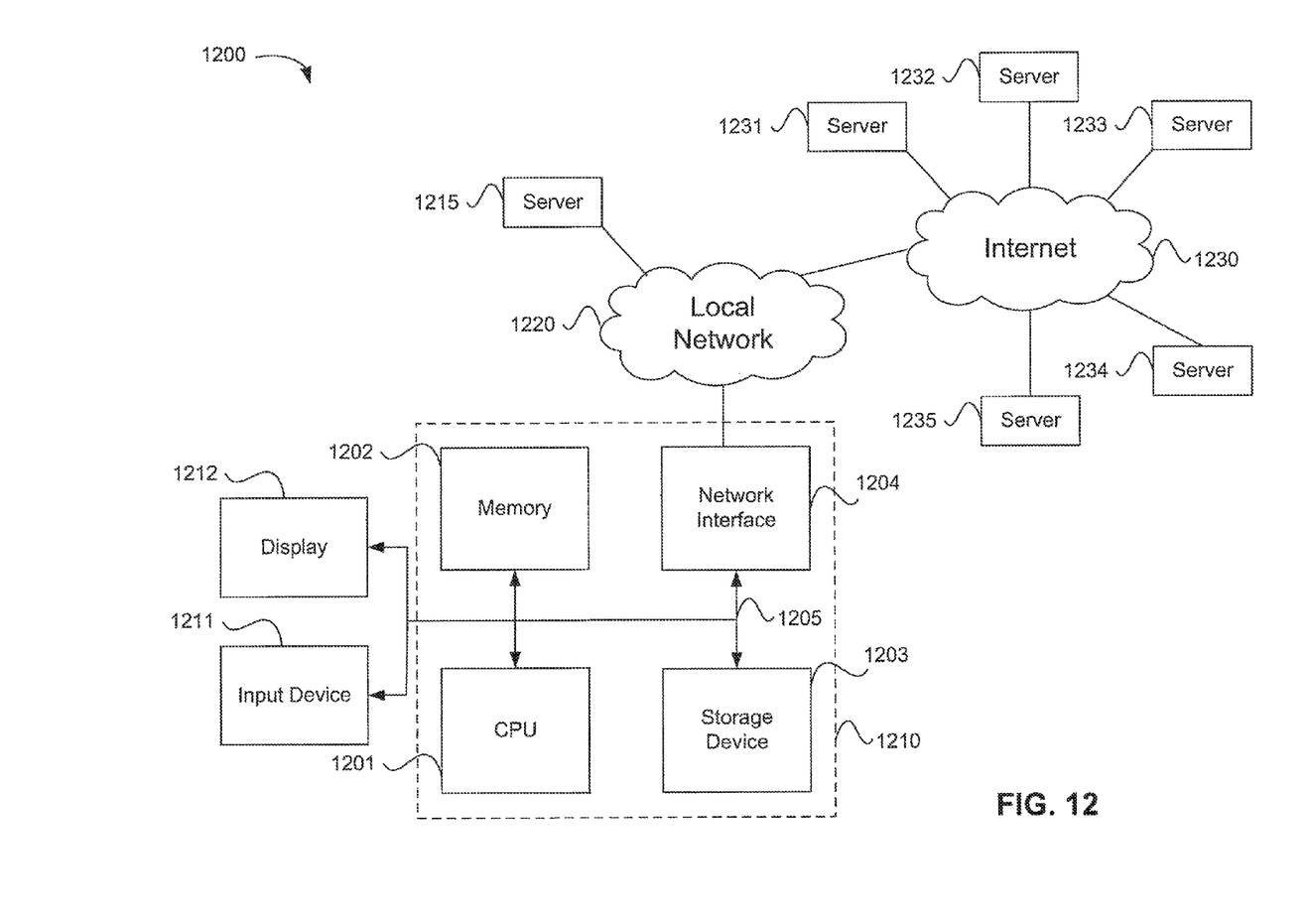
FIG. 12 illustrates an exemplary computer system according to one embodiment.

An exemplary computer system 1200 is illustrated in FIG. 12. Computer system 1210 includes bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   identifying, by a computer system, a plurality of templates from a template library that are applicable to a dataset;
   ranking, by the computer system, the plurality of templates into a ranked list;
   detecting, by the computer system, a selection of a template from the ranked list;
   retrieving, by the computer system, a plurality of algorithms that are associated with the template;
   ranking, by the computer system, the plurality of algorithms;
   selecting, by the computer system, an algorithm from the plurality of algorithms having the highest ranking; and
   applying, by the computer system, the selected algorithm to the dataset to generate a result.

2. The computer-implemented method of claim 1, wherein the selected algorithm is configured using an input parameter and wherein applying the selected algorithm comprises:
   determining, by the computer system, that the dataset has been analyzed in a prior instance;
   identifying, by the computer system, a value assigned to the input parameter when analyzing the dataset during the prior instance; and
   configuring, by the computer system, the selected algorithm by setting the input parameter to the value.

3. The computer-implemented method of claim 1, wherein the selected algorithm is configured using an input parameter and wherein applying the selected algorithm comprises:
   determining, by the computer system, that the selected algorithm has been used in a prior instance for analysis;
   identifying, by the computer system, a value assigned to the input parameter of the selected algorithm during the analysis; and
   configuring, by the computer system, the selected algorithm by setting the input parameter to the value.

4. The computer-implemented method of claim 1, wherein identifying the plurality of templates comprises:
   parsing, by the computer system, the dataset to determine that the dataset includes data having a data type;
   determining, by the computer system, that the data type satisfies a cardinality rule of the template, the cardinality rule specifying data having the data type as input for the plurality of algorithms associated with the template; and
   identifying, by the computer system the template as one of the plurality of templates based on the determination.

5. The computer-implemented method of claim 1, wherein the plurality of templates are ranked according to at least one of a usage history and the dataset.

6. The computer-implemented method of claim 1, wherein ranking the plurality of algorithms comprises:
   first determining, by the computer system, that the dataset contains a missing value in a column of the dataset;
   second determining, by the computer system, that the algorithm is capable of handling missing values; and
   adjusting, by the computer system, a ranking for the algorithm based on the first and second determination.

7. The computer-implemented method of claim 1, wherein ranking the plurality of algorithms comprises:
   first determining, by the computer system, that the dataset contains a column of values that are increasing or decreasing;
   second determining, by the processor, that the algorithm is capable of handling increasing or decreasing values; and
   adjusting, by the computer system, a ranking for the algorithm based on the first and second determination.

8. A non-transitory computer readable storage medium storing one or more programs, the one or more programs comprising instructions for:
   identifying a plurality of templates from a template library that are applicable to a dataset;
   ranking the plurality of templates into a ranked list;
   detecting a selection of a template from the ranked list;
   retrieving a plurality of algorithms that are associated with the template;
   ranking the plurality of algorithms;
   selecting an algorithm from the plurality of algorithms having the highest ranking; and
   applying the selected algorithm to the dataset to generate a result.

9. The non-transitory computer readable storage medium of claim 8, wherein the selected algorithm is configured using an input parameter and wherein applying the selected algorithm comprises:
   determining that the dataset has been analyzed in a prior instance;
   identifying a value assigned to the input parameter when analyzing the dataset during the prior instance; and
   configuring the selected algorithm by setting the input parameter to the value.

10. The non-transitory computer readable storage medium of claim 8, wherein the selected algorithm is configured using an input parameter and wherein applying the selected algorithm comprises:

determining that the selected algorithm has been used in a prior instance for analysis;
identifying a value assigned to the input parameter of the selected algorithm during the analysis; and
configuring the selected algorithm by setting the input parameter to the value.

11. The non-transitory computer readable storage medium of claim 8, wherein identifying the plurality of templates comprises:

parsing the dataset to determine that the dataset includes data having a data type;
determining that the data type satisfies a cardinality rule of the template, the cardinality rule specifying data having the data type as input for the plurality of algorithms associated with the template; and
identifying the template as one of the plurality of templates based on the determination.

12. The non-transitory computer readable storage medium of claim 8, wherein the plurality of templates are ranked according to at least one of a usage history and the dataset.

13. The non-transitory computer readable storage medium of claim 8, wherein ranking the plurality of algorithms comprises:

first determining that the dataset contains a missing value in a column of the dataset;
second determining that the algorithm is capable of handling missing values; and
adjusting a ranking for the algorithm based on the first and second determination.

14. The non-transitory computer readable storage medium of claim 8, wherein ranking the plurality of algorithms comprises:

first determining that the dataset contains a column of values that are increasing or decreasing;
second determining that the algorithm is capable of handling increasing or decreasing values; and
adjusting a ranking for the algorithm based on the first and second determination.

15. A computer implemented system, comprising:
one or more computer processors; and
a non-transitory computer-readable storage medium comprising instructions, that when executed, control the one or more computer processors to be configured for:
identifying a plurality of templates from a template library that are applicable to a dataset;
ranking the plurality of templates into a ranked list;
detecting a selection of a template from the ranked list;
retrieving a plurality of algorithms that are associated with the template;
ranking the plurality of algorithms;
selecting an algorithm from the plurality of algorithms having the highest ranking; and
applying the selected algorithm to the dataset to generate a result.

16. The computer implemented system of claim 15, wherein the selected algorithm is configured using an input parameter and wherein applying the selected algorithm comprises:

determining that the dataset has been analyzed in a prior instance;
identifying a value assigned to the input parameter when analyzing the dataset during the prior instance; and
configuring the selected algorithm by setting the input parameter to the value.

17. The computer implemented system of claim 15, wherein the selected algorithm is configured using an input parameter and wherein applying the selected algorithm comprises:

determining that the selected algorithm has been used in a prior instance for analysis;
identifying a value assigned to the input parameter of the selected algorithm during the analysis; and
configuring the selected algorithm by setting the input parameter to the value.

18. The computer implemented system of claim 15, wherein identifying the plurality of templates comprises:

parsing the dataset to determine that the dataset includes data having a data type;
determining that the data type satisfies a cardinality rule of the template, the cardinality rule specifying data having the data type as input for the plurality of algorithms associated with the template; and
identifying the template as one of the plurality of templates based on the determination.

19. The computer implemented system of claim 15, wherein ranking the plurality of algorithms comprises:

first determining that the dataset contains a missing value in a column of the dataset;
second determining that the algorithm is capable of handling missing values; and
adjusting a ranking for the algorithm based on the first and second determination.

20. The computer implemented system of claim 15, wherein ranking the plurality of algorithms comprises:

first determining that the dataset contains a column of values that are increasing or decreasing;
second determining that the algorithm is capable of handling increasing or decreasing values; and
adjusting a ranking for the algorithm based on the first and second determination.

* * * * *